Sept. 20, 1960  G. E. MILES  2,952,876
EXTRUSION OF SOLID ROCKET GRAINS
Filed Dec. 26, 1957  3 Sheets-Sheet 1
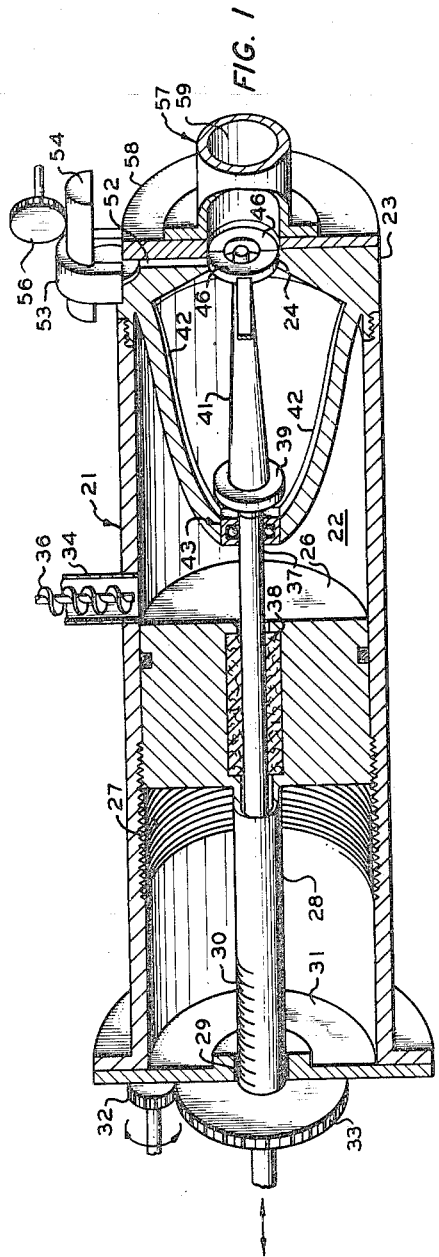
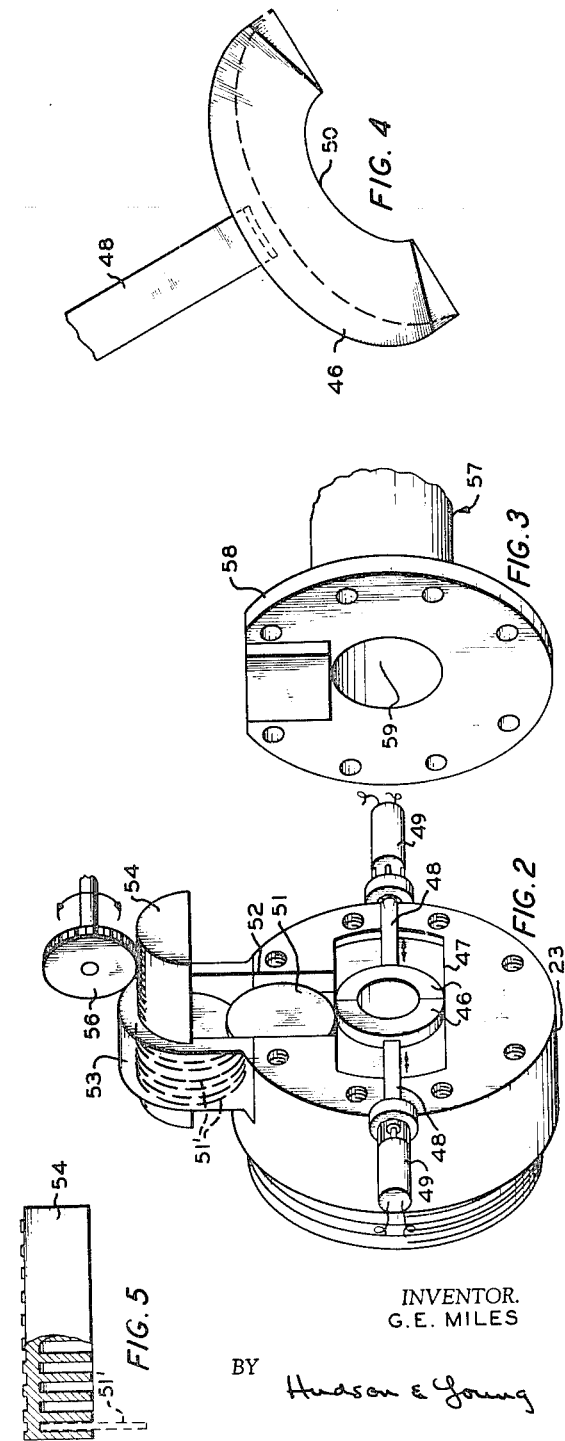
INVENTOR.
G. E. MILES
BY Hudson & Young
ATTORNEYS

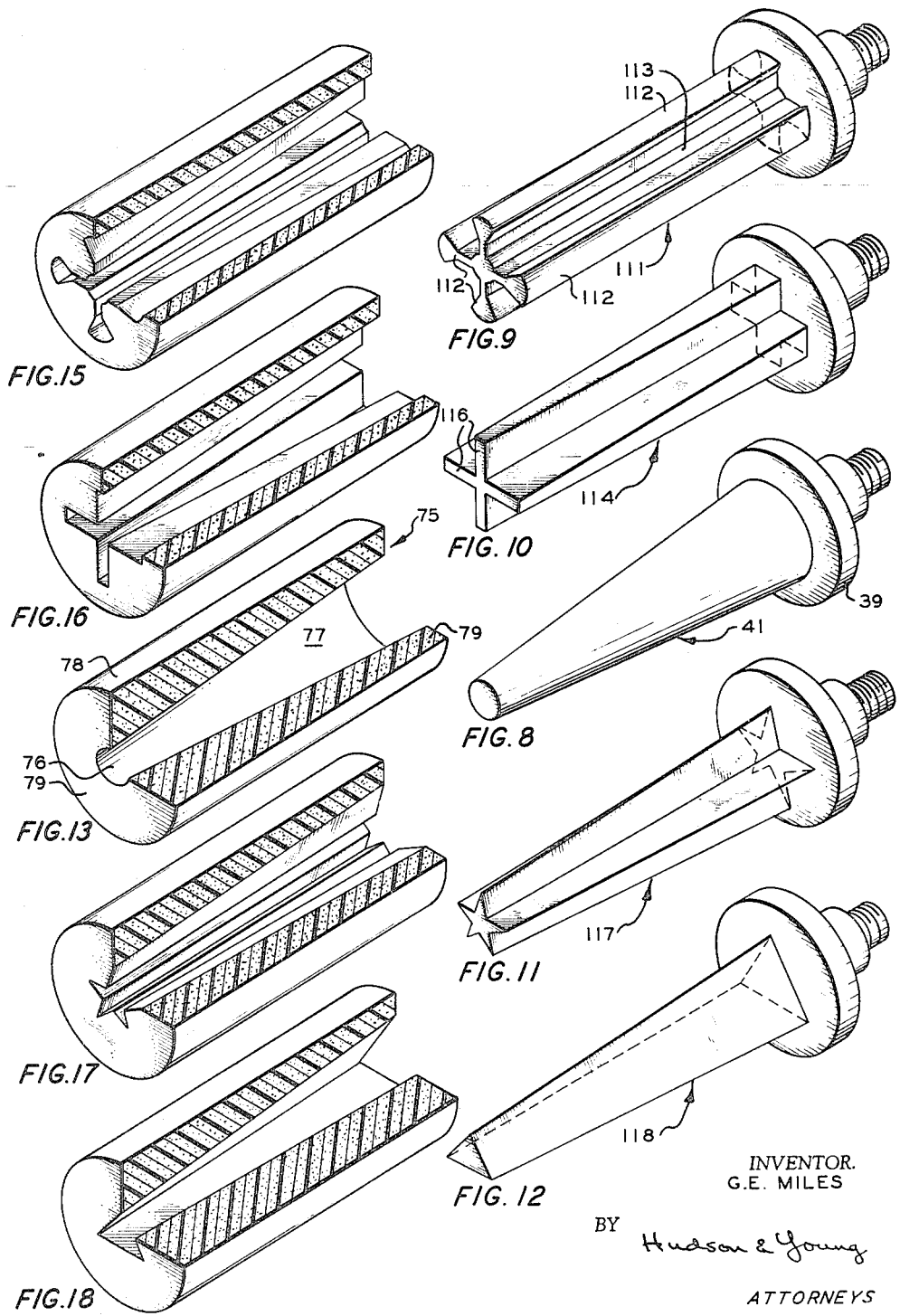

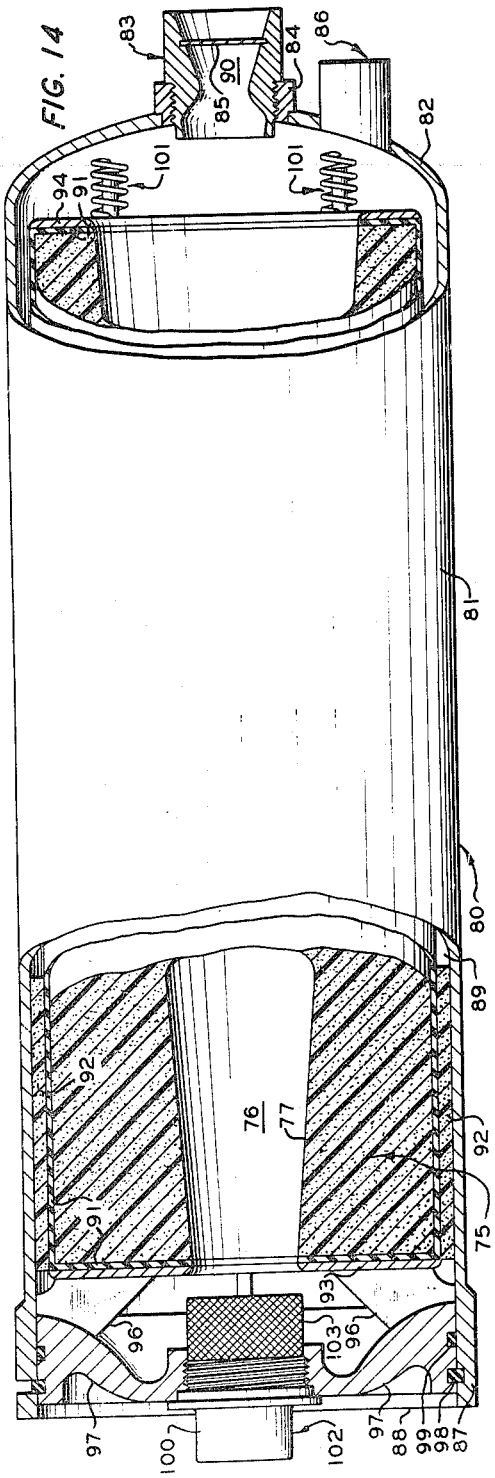
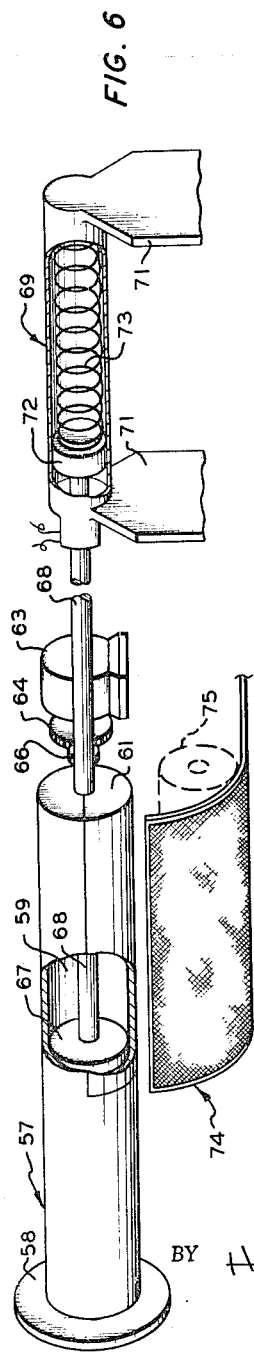
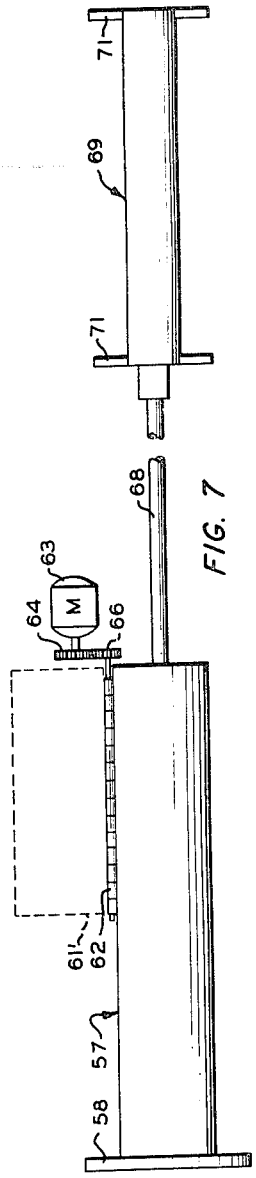

United States Patent Office 2,952,876
Patented Sept. 20, 1960

2,952,876

EXTRUSION OF SOLID ROCKET GRAINS

George E. Miles, Waco, Tex., assignor to Phillips Petroleum Company, a corporation of Delaware Filed Dec. 26, 1957, Ser. No. 705,462

5 Claims. (Cl. 18—30)

This invention relates to the art of extruding. More particularly, it relates to the extrusion of solid rocket propellant in the form of generally a cylindrical grain having an axial perforation, which grain is adapted for loading a suitable rocket motor, such as that employed to assist the take-off of aircraft. In another aspect, it relates to grains of solid rocket propellant so produced.

In recent years, considerable work has been done in the solid rocket propellant art toward development of solid rocket grains having relatively high volumetric loading densities, yet without having to decrease the exposed burning surface area. To this end, various internal-burning grains of propellant have been proposed, designed, or patented having axial perforations of generally constant cross-sectional dimensions defined by the exposed burning surface. While many of these rocket grains are suitable in various standpoints, the volumetric loading densities have not been as high as desirable. This has been due in part to the lack of suitable extrusion apparatus or equipment, consequently resulting in limitations in grain geometry.

Accordingly, an object of this invention is to extrude solid rocket propellant in the form of a grain having a relatively high volumetric loading density. Another object is to provide novel extrusion apparatus or equipment. Another object is to provide a novel manner of extruding. Another object is to provide a grain of solid rocket propellant having a novel geometry or configuration and a relatively high volumetric loading density. A further object is to provide a rocket motor, such as the type employed to assist the take-off of aircraft, loaded or charged with a grain of solid propellant having a novel configuration and a relatively high volumetric loading density. Other objects and advantages of this invention will become apparent to those skilled in the art from which the following discussion, appended claims and accompanying drawing, in which:

Figure 1 is an isometric view in partial section illustrating the preferred extrusion apparatus or equipment of this invention;

Figures 2-7 are views illustrating details of the apparatus of Figure 1;

Figure 8 is an isometric view of the mandrel illustrated in Figure 1;

Figures 9-12 are isometric views of mandrels similar to Figure 8 illustrating various modifications thereof;

Figure 13 is an isometric view in quarter section of a grain extruded in accordance with this invention utilizing the extrusion apparatus of Figure 1 with the mandrel of Figure 8;

Figure 14 is a side view in partial section of a rocket motor, such as the type employed to assist the take-off of aircraft, loaded with a grain extruded in accordance with this invention, such as the grain illustrated in Figure 13; and Figures 15-18 are isometric views of grains in quarter section similar to Figure 13 illustrating various modifications thereof.

Referring to the drawing now, and initially to the extrusion apparatus shown in Figures 1-8, a generally cylindrical container 21 is shown, defining a charging chamber 22, having a head member 23 with a circular die opening or orifice 24. Rotatably and longitudinally movable within chamber 22 is a pressure-exerting ram 26, the rear end of which is provided with external threads adapted to mesh with threads 27 on a portion of the inside wall of container 21. Ram 26 has a shaft 28 which extends from the rear face of the ram and protudes through opening 29 in the rear container member 31. Shaft 28 is adapted to be rotated by suitable power means, such as gears 32, 33, to cause relative movement of ram 26 in chamber 22, shaft 28 having a scale 30 to indicate its displacement. The chamber 22 is filled with extrudable solid propellant material by any suitable means, such as a feed pipe 34 provided with a helical screw 36. The inward displacement of ram 26 causes compression of the propellant material within chamber 22.

Reciprocally disposed within container 21 is an axial shaft 37 which passes through packing gland 38 in ram 26 and through shaft 28, extending from the outer end of the latter where it is connected to a power source adapted to cause reciprocal longitudinal movement of shaft 37. Secured to the inner end of shaft 37 is a piston 39 having a tapered stake or mandrel 41, with a frusto-conical shape, connected thereto which is adapted to pass through die opening 24 when shaft 37 is inwardly displaced. Head 23 has suitable spider means 42 protruding into chamber 22 with axial guide means 43, such as a bearing or packing gland, through which shaft 37 moves. Piston 39 and mandrel 41 are clearly shown in the enlarged view of Figure 8.

Referring to the enlarged detail view of head member 23 shown in Figure 2, a plurality of shearing segments or complementary knives 46 are shown in their shearing position. Knives 46 are relatively thin adapted to move radially within narrow slot 47, as indicated by means of rods 48 which are in turn actuated by suitable means, such as solenoids 49. Knives 46, which are shown in the drawing as being relatively thick for illustrative purposes only, have cutting edges 50 with their outer faces being normal to the axis of mandrel 41 and their inner faces at a small angle thereto. When knives 46 are in their shearing position as shown and mandrel 41 has been moved back into chamber 22 after the extrusion step, a disc 51 is adapted to fall through slot 52 and occupy the space originally taken up by piston 39 behind knives 46. Slot 52 communicates with disc housing 53 in which a plurality of discs 51' are placed. Each disc is moved in turn into the upper end of slot 52 by means of a suitable rack 54 and pinion 56, rack 54 being clearly shown in Figure 5.

Secured to the outer face of head member 23 is a cylindrical land 57 having a head portion 58. Mandrel 41 is adapted to reciprocally move within land chamber 59 when knives 46 are in their retracted position. In Figures 6 and 7, land 57 is shown extending outwardly a substantial distance from head member 23. The outer portion of land 57 is provided with a longitudinal hinged portion 61 which is adapted to pivot at hinge 62 and occupy the position shown in Figure 7 by broken line 61'. Hinge 62 is adapted to be actuated by suitable means, such as motor 65 and gears 64, 66.

Longitudinally movable within land chamber 59 is a piston 67 secured to shaft 68 which protrudes through an opening at one end of land 57. The protruding end of shaft 68 passes through an opening in a spring container 69, supported by legs 71. This end of shaft 68 is provided with a piston 72 which longitudinally moves within spring container 69. A compression spring 73 is disposed within spring container 69 and biases the longitudinal movement of shaft 68. The end of spring container 69 through which shaft 68 moves can be provided with suitable locking means, such as a solenoid actuated lock, to prevent the longitudinal movement of shaft 68.

Placed below hinged land member 61 is a wire screen 74 or the like which is adapted to catch an extruded grain 75 when the hinged land member swings to its retracted position 61'.

It is to be understood that the entire extrusion apparatus or portions thereof can be insulated and/or surrounded with suitable heating jackets, etc. Furthermore, the movement of the various apparatus elements can be synchronized so as to permit automatic and continuous extrusion of grains. The operation of the extrusion apparatus will now be described.

Chamber 22 is filled with an extrudable mass of solid propellant by means of feed pipe 34. Ram 26 is then moved inwardly within chamber 22 by rotation of means 28, 32, 33, the inward displacement being such as to cause compression of the mass of propellant within chamber 22. During this compression knives 46 are in their retracted position and piston 67 occupies a position within land chamber 59 immediately adjacent die opening 24, closing the same and preventing the propellant in chamber 22 from being extruded during the compression step. Subsequently, shaft 37 moves inwardly one grain length within container 21, causing mandrel 41 to pass through die opening 24 into land chamber 59. As mandrel 41 passes into the latter, it pushes piston 67 back into land chamber 59 and the initial grain of propellant is extruded. This grain is cylindrical in shape and has a tapered axial perforation which is occupied by the mandrel 41 when the latter is disposed within land chamber 59. When mandrel 41 has moved its full length through die opening 24, solenoids 49 are actuated to cause rods 48 to move knives 46 into their shearing position so as to cut the end of extruded grain at a point adjacent the outer face of piston 39. Knives 46 are so adapted that their cutting edges 50 radially pass through the extruded grain and contact the outer surface of mandrel 41. At this point in the operation, the initially extruded grain occupies a position within land chamber 59 adjacent head member 23 and removed from hinged land member 61, with piston 67 occupying the position shown in Figure 6. Mandrel 41 is then retracted back into chamber 22 and a disc 51 is allowed to fall through slot 52 and occupy the position initially taken up by piston 39. Knives 46 are then retracted.

The initial grain having been extruded, the operation is repeated starting with compression of the propellant within chamber 22. When mandrel 41 is moved through the die opening 24 to extrude the second grain, it abuts the initially dropped disc 51 and pushes the initially extruded grain into the other end of the land chamber 59, piston 67 moving accordingly. When the initial grain is thus pushed in land chamber 59, land member 61 swings open, allowing the initial grain to fall from the land chamber onto screen 74, after which the hinged land member swings back into place ready to receive the second and subsequently extruded grains which are extruded as before.

Referring to Figure 13, a generally cylindrical grain 75 of solid propellant is shown, this grain being representative of the type extruded by the extruding apparatus or equipment illustrated in Figures 1-8. Grain 75 has tapered axial perforation 76 which is generally circular in cross section. Perforation 76 is defined by inner exposed propellant surface 77 which is adapted to function as an initial burning surface. Grain 75 can have its outer cylindrical surface 78 and ends 79 covered with a layer of any suitable burning restricting material commonly employed for this purpose in the art, such as rubber, so as to confine the initial burning of the propellant material to the exposed burning surface 77.

Referring now to Figure 14, a rocket motor generally designated 80 is illustrated and represents one form of a jet propulsion device which may be employed, for example, to assist the take-off of aircraft. Rocket motor 80 has a cylindrical metal casing 81 having a reduced aft portion 82 which is provided with an axial opening in which is inserted an outlet reaction nozzle generally designated 83 which can be secured to reduced aft portion 82 by an annular lock member 84 or the like. Nozzle 83 has a converging-diverging passage 90, across which is a starter disc 85, designed to burst when the pressure in chamber 89 reaches a predetermined pressure. Although nozzle 83 is illustrated as being separable, it is, of course, within the scope of this invention to make the nozzle integral with the reduced aft portion 82. The latter can be provided with one or more safety plug attachments generally designated 86 which are capable of releasing excessive pressure from the combustion chamber in a manner well known to those skilled in the art. The other or head end of casing 81 can be in the form of a flange 87 and this end of the casing is closed by a closure or cap member 88.

The casing 81 defines a cylindrical combustion chamber 89 which is loaded with a grain of solid propellant generally designated 75. This grain 75 is cylindrical in shape and can have an outer diameter slightly smaller than the inner diameter of casing 81. Grain 75 is of the internal-burning type by reason of axial perforation 76 which is defined by internal burning surface 77. The outer cylindrical surface and the two ends of the grain 75 are covered with restricting material 91 which confines the burning of the grain to the exposed burning surface 77. A plurality of resilient pads or strips 92 made, for example, of sponge rubber, can be placed between the head portion of the grain 75 and the adjacent portion of the casing 81. These strips 92 can be adhesively bonded to the outer cylindrical surface of grain 75 and the inner surface of casing 81; it is to be understood, however, that although such an arrangement is preferred, any suitable means can be employed to support the grain 75 within the chamber 13. Retaining end plates 93 and 94 are attached to the ends of the grain 75 adjacent the outer faces of the restricting material 91 attached to these ends. The plates 93 and 94 and the restricting material 91 adjacent thereto have axial openings which are in alignment with the corresponding adjacent ends of perforation 76. Secured to the head retaining plate 93 are outer-extending prongs or legs 96 which are adapted to register with a grain retaining assembly 97 which can be made, for example, of aluminum and which can be secured to the inside of the head end of casing 81 by a key 98 and a sealing ring 99. The aft retaining plate 94 can have secured to its outer surface a plurality of spring members 101, each of which comprises a prong surrounded by a compression spring which is adapted to come into contact with the inside of the reduced aft portion 82.

Inserted within an axial opening in closure member 88 and threadedly engaging retaining assembly 97 is an igniter plug 102 having a removable cover 100. Attached to the inner end of igniter plug 102 is a perforated container 103, such as a wire basket, the perforations of which are preferably closed by rubbery or plastic material, such as a cellulose acetate plastic molding compound or other suitable covering material which will rapidly soften or rupture upon being subjected to heat and/or pressure. This perforated container is described and claimed in the copending U.S. application Serial No. 605,904, filed August 23, 1956, by O. D. Ratliff. Igniter material is disposed within the container 103 in contact with suitable electro-responsive means, such as squibs or matches. The igniter material is preferably in granular or pelleted form, each discrete particle comprising powdered metal, powdered oxidizing material and ethylcellulose (which acts as a binding agent). While it is not intended to limit this invention to any particular igniter material, and any suitable igniter material can be utilized, e.g., black powder, the aforementioned granular or pelleted igniter material is especially useful in the practice of our invention, such igniter material being disclosed and claimed in copending U.S. application Serial No. 592,995, filed June 21, 1956, by L. G. Hering. Ignition sustaining material in the form of a disc can also be disposed in container 103, which material furnishes addition igniter decomposition products for a period of time in addition to that time during which decomposition products are furnished by the pelleted igniter material. For example, the pelleted igniter material may burn for about 150 milliseconds and the disc of sustainer material may burn for a period of about 500 milliseconds. This sustaining igniter material is disclosed and claimed in copending U.S. application Serial No. 591,340 filed June 14, 1956, by B. R. Adelman. The decomposition products from all the igniter material flow into the combustion chamber 89, following the rupture or melting of the coating material on the container 103.

Figures 15–18 illustrate other types of grains of solid rocket propellant which can be extruded in accordance with this invention, for example employing with the extrusion apparatus illustrated in Figures 1–8, by substituting the respective mandrels illustrated in Figures 9–12 for that of mandrel shown in Figure 8. These grains are loaded in a rocket motor, such as that illustrated in Figure 14. The mandrels in Figures 9–12 all have cross-sectional areas which uniformly and progressively increase from the forward ends to the rear ends.

The mandrel 111 of Figure 9 is generally cruciform in cross section. The arms 112 of mandrel 111 flare outwardly and are tapered from one end to the other with the inner ends of the arms connected to a shaft or hub 113. The use of mandrel 111 will produce a grain like that illustrated in Figure 15.

The mandrel 114 of Figure 10 is cruciform in cross section with a plurality of arms 116 tapered from one end to the other. This mandrel is employed in extruding grains like that of Figure 16. The radial length of arms 116 can also progressively increase toward the rear end of the mandrel.

In Figure 11, the mandrel 117 is generally star-shaped in cross section and tapered from one end to the other. This type of mandrel can be used in the extrusion of a grain having a tapered star perforation, such as that illustrated in Figure 17. The radial length of each star point can be constant throughout the length of the mandrel, or can progressively increase as shown.

The mandrel 118 of Figure 12 is generally triangular in shape and tapered from one end to the other; this mandrel can be used in extruding the grain illustrated in Figure 18. Tapered mandrels with other polygonal forms (e.g., square, pentagonal, hexagonal, etc.) can also be used.

In extruding the grains of Figures 15–18, the shearing means or knives can be adapted to conform with the particular mandrel employed by modifying the cutting edges and using a plurality of complementary segments.

The rocket motor of this invention, such as that illustrated in Figure 14, is operated by first arming it by removing igniter plug cover 100 from the igniter assembly and connecting the electrical connections thereof to an electrical power circuit. Upon closing of a suitable switch, electrical current flows to the electro-responsive means such as squibs, whereupon the igniter material in container 103 is ignited with the consequent production of igniter decomposition products. These products melt or otherwise rupture the coating on the container 103 and the igniter products flow into the combustion chamber 89, the introduction being primarily directed down through the axial perforation 76. The heat from these decomposition products is transferred to the exposed burning surface 77 of grain 75, raising the temperature thereof to an ignition temperature. As a result, the propellant material begins to burn and generate combustion gases which raise the temperature and pressure within the combustion chamber 89, causing the starter disc 85 to burst or rupture at a predetermined pressure. Thereafter, the combustion gases flow through the nozzle passage 90 at a high velocity, thereby imparting thrust to the rocket motor.

The grains of solid propellant extruded in accordance with this invention have relatively high volumetric loading densities due to the tapered axial perforations or ports. With this type of geometry, the maximum combustion chamber pressure can be reduced so that, as a net result, the specific impulse of the rocket motor is relatively high. The largest port area of the perforation is adjacent the reaction nozzle, thereby minimizing the erosive effect of the higher gas velocities on the propellant material.

Although the extrusion apparatus or equipment of this invention is believed particularly useful in extruding solid rocket propellant in the form of grains, it will be evident that this extrusion equipment can be used for extruding other types of materials, such as plastics and the like, to form similarly shaped extrusions.

The solid rocket propellant which can be extruded can be any of the propellants known in the art, but the propellant especially applicable in this invention is that of the composite type comprising a fuel or binder and an oxidizer.

Particularly useful propellant compositions which may be utilized in the practice of this invention are of the rubbery copolymer-oxidizer type which is plasticized and worked to prepare an extrudable mass at 130° F. to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° F. to 185° F. In addition to the copolymer binder and oxidizer, the propellant composition can comprise a burning rate catalyst.

Solid propellant compositions particularly useful in the preparation of the grains used in this invention are those disclosed and claimed in copending application Serial No. 284,447, filed April 25, 1952, by W. B. Reynolds and J. E. Pritchard. These propellants are prepared by mixing the copolymer with a solid oxidizer, a burning rate catalyst, and various other compounding ingredients so that the reinforced binder forms a continuous phase and the oxidizer a discontinuous phase. The resulting mixture is heated after extrusion to effect curing of the same.

The copolymers are preferably formed by copolymerization of a vinyl heterocyclic nitrogen compound with an open chain conjugated diene. The conjugated dienes preferably employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex, Marasperse-CB, or similar surface active agent, can be added to the carbon black slurry or to the water used to prepare the slurry.

Applicable oxidizers are inorganic oxidizing salts such as the ammonium, alkali metal, and alkaline earth metal salts of nitric, perchloric, and chloric acids. These salts include ammonium nitrate, ammonium perchlorate, etc., and mixtures thereof.

The following empirical formulation or recipe generally represents the class of propellant compositions preferred for the preparation of the grains of propellant of this invention:

*Table I*

| Ingredient | Parts per 100 parts of rubber | Parts by Weight |
|---|---|---|
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidizer (Ammonium nitrate) | | 75–90 |
| Burning rate catalyst | | 0–30 |

Suitable plasticizers useful in preparing these grains of propellant include TP–90–B (dibutoxyethoxyethyl formal supplied by Thiokol Corp.); benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate, supplied by American Cyanamid Co.). Satisfactory rubber cure accelerators include Philcure 113 (SA–113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides. Suitable burning rate catalysts include ferroxyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The layer of restricting material can be made from any of the slow burning materials used for this purpose in the art, such as cellulose acetate, ethylcellulose, butadiene-methylvinylpyridine copolymer, GR–S, natural rubber, and the like.

Various modifications and alternatives of our invention will become apparent to those skilled in the art; and it is to be understood that the foregoing discussion and drawing merely illustrates preferred embodiments of our invention and do not necessarily limit the same.

We claim:

1. An extrusion molding apparatus, comprising a cylindrical container having an opening at one end thereof, means to fill said container with extrudable material, pressure-exerting means slidably disposed in said container and adapted to compress said material, means normally closing said opening, land means communicating with said opening, reciprocating means in said container comprising a tapered mandrel adapted to move its entire length through said opening and extrude into said land means an article of said material having a tapered axial perforation conforming in shape to said mandrel, and means biasing the movement of said mandrel into said land means.

2. An extrusion molding apparatus, comprising a cylindrical container having a circular die opening at one end thereof, means to fill said container with extrudable material, a pressure-exerting ram slidably disposed in said container and adapted to longitudinally move within said chamber toward said opening so as to compress said material, means normally closing said opening, land means communicating with said opening, a reciprocating shaft axially disposed within said container, spider means adapted to support and guide said shaft, a tapered mandrel connected to one end of said shaft and adapted to move its entire length through said opening, the smallest cross section of said tapered mandrel being adjacent said opening when the former is in its retracted position within said container, said movement of said mandrel through said opening adapted to extrude into said land means a cylindrical article of said material having a tapered axial perforation conforming in shape to said mandrel, means adapted to cut off said article after said mandrel moves through said opening, and means in said land means biasing the movement of said mandrel into said land means.

3. The apparatus of claim 2 wherein said tapered mandrel is frustoconical in shape.

4. The apparatus of claim 2 wherein said tapered mandrel is generally cruciform in cross section and comprises longitudinally tapered arms, the inner ends of which are connected to a tapered hub.

5. An extrusion molding apparatus, comprising a cylindrical container having a circular die opening at one end thereof, means to fill said container with extrudable material, a pressure-exerting ram slidably disposed within said container and adapted to longitudinally move within said chamber toward said opening so as to compress said material, means normally closing said opening, a cylindrical land axially connected to said container and communicating with said opening, a reciprocating shaft axially disposed within said container, spider means in said container adjacent said one end thereof and adapted to support and guide said shaft, a tapered mandrel connected to one end of said shaft and adapted to move its entire length through said opening, the smallest cross section of said mandrel being adjacent said opening when the former is in its retracted position within said container, said movement of said mandrel through said opening adapted to extrude a cylindrical article of said material into said cylindrical land, the initial movement of said mandrel through said opening into said land being biased by means slidably moveable within said land, said article having a tapered axial perforation conforming in shape to said mandrel, solenoid-actuated cutting elements adapted to radially cut said article while said mandrel is in its full extruded position, and means adapted to fall into said opening after said mandrel is retracted back into said container.

References Cited in the file of this patent

UNITED STATES PATENTS

| | | |
|---|---|---|
| 284,794 | Allen | Sept. 11, 1883 |
| 2,171,095 | Orsini | Aug. 29, 1939 |
| 2,379,956 | Ersepke | July 10, 1945 |
| 2,443,053 | Parmelee | June 8, 1948 |
| 2,600,678 | O'Neill | June 17, 1952 |
| 2,628,561 | Sage et al. | Feb. 17, 1953 |
| 2,817,113 | Fields | Dec. 24, 1957 |